United States Patent [19]
Bittihn et al.

[11] Patent Number: 4,753,715
[45] Date of Patent: Jun. 28, 1988

[54] PROCESS FOR THE PRODUCTION OF ELECTRICALLY CONDUCTING ORGANIC POLYMER COMPOUNDS AS THICK FILM ELECTRODE MATERIALS FOR RECHARGEABLE GALVANIC ELEMENTS

[75] Inventors: Rainer Bittihn, Kelkheim; Friedrich Woeffler, Schmitten, both of Fed. Rep. of Germany

[73] Assignee: Varta Batterie Aktiengesellschaft, Hanover, Fed. Rep. of Germany

[21] Appl. No.: 77,128

[22] Filed: Jul. 24, 1987

[30] Foreign Application Priority Data

Aug. 2, 1986 [DE] Fed. Rep. of Germany ....... 3626341

[51] Int. Cl.$^4$ ................................................. C25D 9/02
[52] U.S. Cl. ................................... 204/14.1; 204/58.5
[58] Field of Search ..................... 204/14.1, 56.1, 58.5

[56] References Cited

U.S. PATENT DOCUMENTS 3,697,398 10/1972 Wessling ............................ 204/58.5
4,180,442 12/1979 Byrd .................................. 204/58.5

Primary Examiner—T. M. Tufariello
Attorney, Agent, or Firm—Weiser & Stapler

[57] ABSTRACT

In the electropolymerization of monomers, especially pyrrole, thiophene or furan, conducting polymer films with high surface-specific capacity and favorable kinetics can be deposited for use as electrode materials in galvanic storage batteries, despite their relatively large film thickness, by impressing the selected deposition primary current $i_1$ with at least one short current impulse having a magnitude $i_2$ which is several times that of the primary current. This current impulse also sharply increases the deposition potential $\eta_1$ corresponding to the primary current $i_1$.

12 Claims, 1 Drawing Sheet

PROCESS FOR THE PRODUCTION OF ELECTRICALLY CONDUCTING ORGANIC POLYMER COMPOUNDS AS THICK FILM ELECTRODE MATERIALS FOR RECHARGEABLE GALVANIC ELEMENTS

BACKGROUND OF THE INVENTION

The present invention relates generally to a process for the production of electrically conducting organic polymer compounds of polyconjugated structure for use as electrode materials in rechargeable galvanic elements, particularly those which are deposited as films on an electronically conducting surface by anodic current from an aqueous or organic solution of the monomer in the presence of conducting salts.

It has long been known that a variety of polymer compounds which are capable of reversible oxidation and reduction by accepting positive or negative ions of inorganic salts, can be used as chargeable and rechargeable electrode materials in electrochemical cells. To this end, the production of such materials by electropolymerization is especially suitable. In electropolymerization, the polymer is deposited by an anodic current on a suitable carrier from an aqueous or organic solution of the monomer. In the case of a positively doped polymer, to maintain electroneutrality of the polymer during the polymerization, anions of a conducting salt simultaneously present in the solution are also incorporated in the deposition product.

EP-OS No. 166,980 describes the preparation of a conducting polypyrrole, and several pyrrole copolymers, based on this technique. EP-OS No. 99,055 indicates that the above-described electrolysis can be continuously performed by using a rotating roller as the anode. In this case, the roller is only partially submerged in the electrolyte solution, and the deposited active material is continuously removed from the surface of the roller as an endless strip of film.

After the polymer has been incorporated in a galvanic cell, the salt anions incorporated during polymerization can be reversibly removed and added. The rate at which this occurs depends on the thickness of the polymer film. Consequently, a thick film with a correspondingly high capacity may be charged and discharged only with small currents if its charge capacity is to be fully converted.

German patent application No. P 36 07 378.4 describes the use of a polymer foil comprised of several thin film layers instead of a single compact foil of a given thickness. Using such a layered foil as an electrode has been found to allow better utilization of its surface-specific capacity (i.e., better current-carrying capacity with the same charge conversion). However, it remained to provide similar performance in connection with relatively thick, compact films.

SUMMARY OF THE INVENTION

It is therefore the principal object of this invention to provide a method for producing polymer electrodes which makes it possible to produce relatively thick compact films with favorable electrode kinetics.

This and other objects are achieved according to the present invention by an improved process for the production of electrically conducting organic polymer compounds of polyconjugated structure for use as electrode materials in rechargeable galvanic elements, which are deposited as films on an electronically conducting surface by anodic currrent from an aqueous or organic solution of the monomer in the presence of conducting salts, wherein at least one short current impulse which is several times as intense as the primary current selected for the deposition is superimposed on the primary current during the production process.

Further detail regarding the production process of the present invention is provided with reference to the description which is provided below, taken in conjunction with the following illustrations.

DETAILED DESCRIPTION OF PREFERRED EMBODIMENTS

Figure 1A:
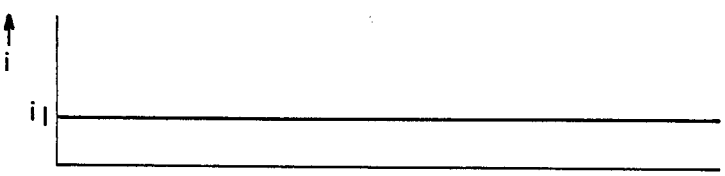
FIGS. 1(a) and 1(b) are graphs showing conventional electropolymerization behavior, with respect to time.
Figure 1B:
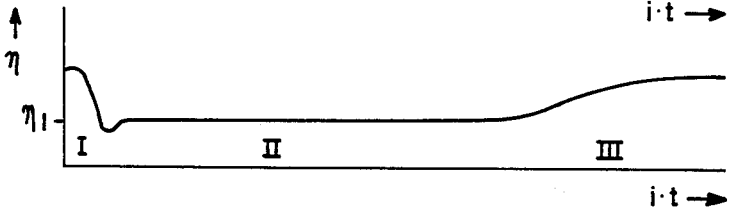

FIG. 1(a) shows that with galvanostatic control of the electropolymerization, and with a selected primary current $i_1$, the resulting amount of polymerization is proportional to the amount of charge applied for a given amount of time (t), being equal to the time integral $i_1 \cdot t$. FIG. 1(b) shows the resulting potential curve. Initially, a maximum potential is exhibited (at the beginning Phase I) due to the high deposition polarization which accompanies the start-up of the polymerization process. The potential curve then enters a longer-lasting phase (Phase II) which exhibits a constant, relatively low potential $\eta_1$.

It was observed that during this latter time interval (Phase II), comparatively thin polymer layers with very favorable kinetics are formed. However, as the polymerization continues (into Phase III), an increase in film thickness results in a rise in the polymerization voltage. Polymer films from this phase have the disadvantage of reduced charge acceptance and release at higher currents, so that their higher surface-specific capacity has only limited usefulness.

Phases I, II and III are believed to be a result of the polymer's crystallization behavior. Phase I, which involves nucleus formation with high over-voltage, is followed by a phase of uniform crystal growth (Phase II), which is in turn followed by a coalescence of the initially "isolated" crystals into a "smooth" surface (Phase III).

Figure 2A:
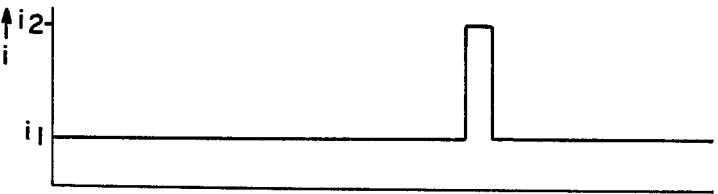
FIGS. 2(a) and 2(b) are graphs showing the modification of such behavior when the process of the present invention is used.
Figure 2B:
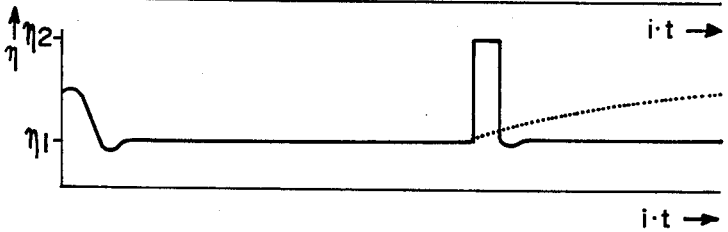

In accordance with the present invention, it has been found that polymer films with good kinetic behavior can be obtained by impressing the primary current with at least one short current impulse having a magnitude which is several times greater than that of the primary current. Thereafter, the polymerization is continued with the originally selected, relatively low primary current $i_1$. FIG. 2(a) shows the current impulse as a rectangular pulse, of a magnitude $i_2$. At the deposition anode, this current impulse produces a corresponding voltage surge which, as shown in FIG. 2(b), raises the primary potential $\eta_1$ to the value $\eta_2$.

It has been found to be especially advantageous to trigger or repeat the current impulse whenever the primary potential $\eta_1$ rises appreciably, thus signaling the beginning of a polymerization Phase III (shown in broken lines). When the current strength falls back from $i_2$ to $i_1$, the low polymerization voltage $\eta_1$ previously observed during Phase II is again established for an extended amount of time as the polymerization continues. The sequence of the current impulses can also be monotonic, i.e., the current impulses can be repeated at constant time intervals, if desired.

The duration of the current impulse applied to the deposition anode should be in the minute range, and preferably about one minute. The current strength (magnitude) of the impulse should be at least twice as great as the strength (magnitude) of the primary current, and preferably eight to twelve times stronger (e.g., a factor of ten).

In accordance with the present invention, as soon as the primary potential ($\eta$) begins to rise, indicating deterioration of the kinetic properties of the deposited material, the primary potential can be reduced by another current impulse. By repeating this measure, as needed, it can be ensured that virtually all of the polymer is formed at the lowest possible potential, and that the polymer therefore has the desired property of a high surface-specific capacity that is largely independent of the load.

Figure 3A:
FIGS. 3(a) and 3(b) are graphs showing a variation of the process of the present invention.
Figure 3B:
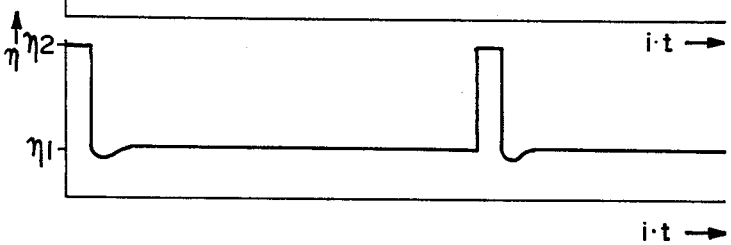

Yet another variation of the process of the present invention is shown in FIG. 3. In this variation, a current impulse is produced at the very beginning of the flow of current (i.e., the electropolymerization is started with a current impulse), independently of the number and/or periodicity of the current impulses to be applied throughout the deposition process. The voltage peak $\eta_2$ corresponding to this initial current impulse $i_2$ overlaps with the initial polarization otherwise occurring at this point, however, its magnitude is generally equal in value to the voltage loads of the polymerization anode which could possibly follow.

Polypyrrole, polythiophene or polyfuran films produced according to the process of the present invention are especially effective as electrode materials for exhibiting the fast kinetics which are desired. In performing the process of the present invention, the actual deposition conditions can be controlled either galvanostatically or potentiostatically, although galvanostatic control is preferable.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A process for producing electrically conducting organic polymer compounds of polyconjugated structure for use as electrode materials in rechargeable galvanic elements, which are deposited as films on an electronically conducting surface by primary anodic current from an aqueous or organic solution of the monomer in the presence of conducting salts, comprising the step of:

superimposing on the primary current at least one current impulse having a magnitude which is a multiple of the magnitude of the primary current selected for the deposition.

2. The process of claim 1 wherein the polymer deposition begins with a current impulse.

3. The process of claim 1 wherein a succession of current impulses are applied to the primary current.

4. The process of claim 3 wherein said succession of current impulses are applied to the primary current at periodic time intervals.

5. The process of claim 3 wherein another current impulse is applied to the primary current when the potential at the deposition anode rises.

6. The process of claim 1 wherein the duration of the current impulse is in the minute range.

7. The process of claim 6 wherein the duration is about one minute.

8. The process of claim 1 wherein the magnitude of the current impulse is at least twice as great as the magnitude of the primary current.

9. The process of claim 8 wherein the magnitude of the current impulse is eight to twelve times the magnitude of the primary current.

10. The process of claim 1 wherein the polymer compound is selected from the group consisting of polypyrrole, polythiophene and polyfuran.

11. The process of claim 1 wherein the primary current and the current impulse are galvanostatically controlled.

12. The process of claim 1 wherein the primary current and the current impulse are potentiostatically controlled.

* * * * *